Nov. 6, 1928.

R. C. LEAKE 1,691,014

REBASING LAMPS

Filed July 28, 1922

R. C. Leake,
INVENTOR

BY Neil D. Preston
his ATTORNEY

Nov. 6, 1928. 1,691,014
R. C. LEAKE
REBASING LAMPS
Filed July 28, 1922    2 Sheets-Sheet 2
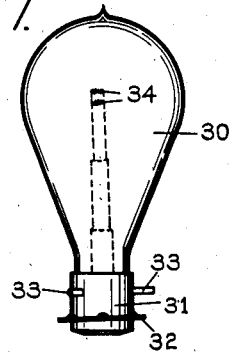
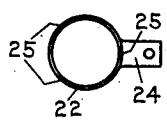
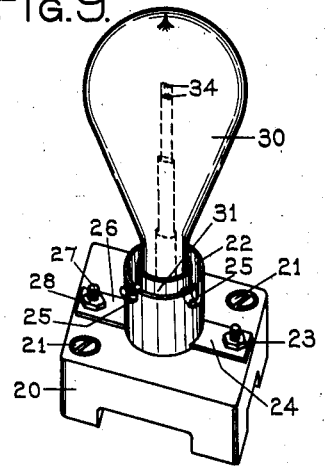
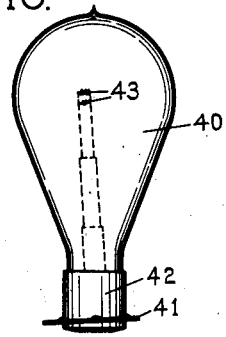
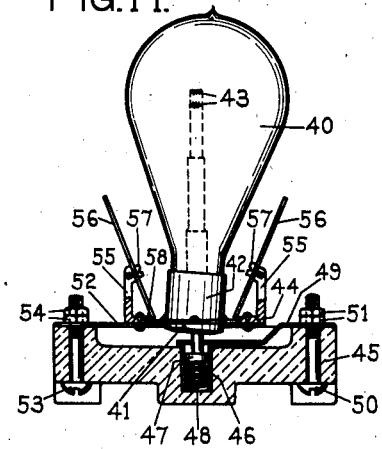
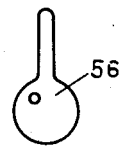

Patented Nov. 6, 1928.

1,691,014

UNITED STATES PATENT OFFICE.

RICHARD C. LEAKE, OF ROCHESTER, NEW YORK, ASSIGNOR TO GENERAL RAILWAY SIGNAL COMPANY, OF GATES, NEW YORK, A CORPORATION OF NEW YORK.

REBASING LAMPS.

Application filed July 28, 1922. Serial No. 578,148.

This invention relates to structure of a mounting or support for electric lamps used in light projecting systems, and more particularly for the mounting of concentrated filament lamps employed in light signals for railway signaling purposes.

In order to obtain visibility of light signals for a long range and through a considerable angle of spread, during the day time as well as at night, and to maintain a desirable low energy consumption, an efficient light projecting unit is necessary. To accomplish these ends, besides well designed optical devices or light concentrating devices, such as reflectors, lenses and the like, it is necessary to have a concentrated light source properly located with respect to the focus of such optical devices. If the concentrated light source is an incandescent lamp which must be renewed from time to time, it is desirable to be able to make such replacement in the field conveniently, and at the same time have the replaced filament assume the same and proper relation both as to the position of the filament and the relation of the side of the filament giving the most desired illumination with respect to the optical devices as that of the replaced lamp. Lamps manufactured in quantities on a commercial scale, however, do not ordinarily have their filaments in any definite relation with respect to their bases; and consequently when lamps of this kind are used in connection with light concentrating devices to replace lamps burned out or are otherwise rendered unfit for service, adjustment to properly focus the lamps substituted would be required. Such adjustments of lamps in the field are cumbersome and an expensive expedient, since at least two experienced workmen are required, one at the signal to change the adjustment and the other at a distance along the track to determine from the appearance of the signal when the proper adjustment has been made.

With the idea of obviating the necessity of this procedure each and every time a new lamp is placed in service, it is proposed in the present invention to fix up or rebase commercial lamps in such a manner that their respective filaments will be accurately located with respect to the optical devices in which they are to be used when the lamps are placed in service.

On account of the importance of having the filament of various lamps placed in a signal to come at the same and proper point, it is desirable to provide a suitable mounting for the lamp which will permit it to be quickly and easily detached, which will positively position the same in a predetermined manner, and which will properly cooperate with the fixed up or rebased commercial lamps above referred to.

Other objects, purposes and advantages of the invention will in part be referred to and in part be obvious as the description progresses.

In describing the invention in detail, reference will be made to the accompanying drawings, in which:—

Fig. 7 illustrates still another modification of the invention in which pins are secured directly to the usual base with reference to the filament of a lamp;

Fig. 8 is a plane view of a socket adapted to receive the rebased lamp shown in Fig. 7;

Fig. 9 shows the devices shown in Figs. 7 and 8 assembled on an insulating block to form a complete unit;

Fig. 10 shows a lamp having a supplemental base of still another form;

Fig. 11 illustrates the lamp shown in Fig. 10 contained in a suitable lamp support;

Fig. 12 is a plane view of the locking lever used in connection with the lamp support shown in Fig. 11; and Fig. 13 is a plane view of the supplemental base secured to the lamp shown in Fig. 10.

Each of the embodiments of the invention illustrated shows a lamp provided with a supplemental base and a suitable lamp support or socket on which the particular supplemental base is adapted to fit. It should be understood that in practice these lamp supports are positioned in the casing of a light signal and the like for railway signaling purposes, which are provided with lenses, and are positioned in a manner so that when a standardized lamp is placed in this socket, or on such lamp support, it will have its filament in the focus of such lens. In applying these lamp supports or sockets to the signal casing, they will be temporarily supported by a suitable jig or fixture which will give them the proper relation to the lens, after which they will be permanently fastened.

Likewise, the supplemental base in each of the embodiments of the invention illustrated is applied to the lamp base, by a suitable jig or fixture including a sighting device, so that the supplemental base will have a predetermined relation to the concentrated filament of such lamp, this relation being such that the completed rebased lamp will correspond to the standardized lamp above referred to. This purpose of standardizing lamps and supports, therefore, is common to each of the embodiments of the invention illustrated, and should be borne in mind in connection with the following description.

Figure 1:
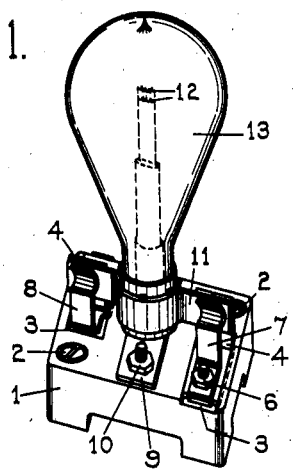
Figure 1 shows an embodiment of the present invention in which a conducting strap has been secured to the base of a commercial concentrated filament lamp, and a lamp base to which the strap may be detachably connected by a spring latch.
Figure 2:
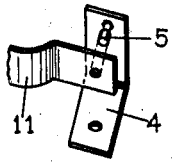
Fig. 2 shows certain detail parts of the invention illustrated in Fig. 1.

In Fig. 1 is shown an assembly of a standardized rebased lamp, and a lamp support therefor for carrying out the purpose above mentioned. In this figure a base 1 of suitable insulating material, such as porcelain, bakelite or the like, is provided having holes on diagonal opposite corners containing anchoring screws 2 for firmly securing the base in a light signal casing. The top face of this insulating base is provided with notches or recesses 3 in which are supported angle brackets 4 each having a pin 5 riveted to one leg thereof (see Fig. 2), the other leg being perforated and fastened to the base 1 by a bolt 6. These angle brackets are provided with flat springs 7 and 8 pressing toward the pins 5 and fastened in place by the bolts 6. Near the middle of the block is fastened a spring center contact strip 9 by a bolt and nut 10, this center contact strip affording an electrical circuit to the center contact of the usual lamp base.

A conducting strap 11, shaped as shown, is soldered. spot-welded, or secured to the base of a commercial incandescent lamp in any other suitable manner, so that the double concentrated filament 12 of that particular lamp will have a predetermined relation to this conducting strap 11, as heretofore pointed out. This strap 11 has holes in its ends to fit over the pins 5, and this strap, being stiff and rigid, holds the lamp firmly in the desired position.

To remove the lamp and its supplemental base, comprising the conducting strap 11, the bulb 13 of the lamp is leaned forward so that the conducting strap 11 disengages from the pins 5, th .eby allowing the lamp to be lifted out. It is thus seen that this construction facilitates ready removal and replacement of a lamp, and holds the lamp and its filament in one predetermined position.

Figure 3:
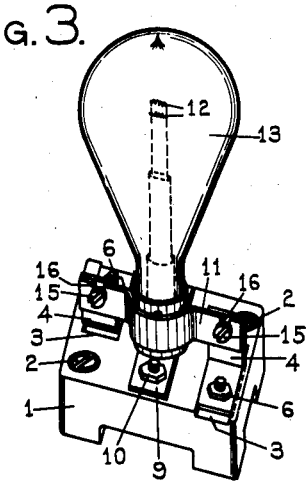
Figs. 3 and 4 show similar views of a modified form of the device illustrated in Figs. 1 and 2.
Figure 4:
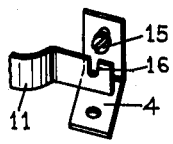

In Figs. 3 and 4 is shown a modification of the form of the invention shown in Fig. 1 which in many respects is the same, and therefore like parts have been given the same reference character. Instead of the pins 5, the angle brackets 4 are each provided with a screw 15, and instead of the holes in the conducting strap 11 notches or slots 16 are provided. In order to interchange lamps in this construction, the screws 15 are loosened slightly, after which the lamp may be pushed downward against the spring contact strap 9 to allow the screw 15 to clear the notches 16, after which another lamp which has been likewise standardized may be substituted therefor.

Figure 5:
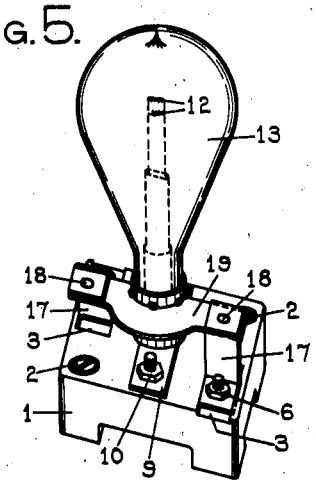
Figs. 5 and 6 show still another modified form in which the conducting strap has its edge connected to the lamp base.
Figure 6:
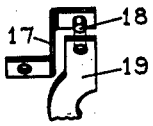

Figs. 5 and 6 illustrate another modification of the invention, in which two Z-bars 17 are fastened in the notches or recesses 3. These Z-bars 17 are each provided with a pin 18 extending downward therefrom (see Fig. 6). In this form of the invention, a supplemental base or conducting strap 19 is provided, having its edge soldered or otherwise secured to the usual lamp base of an incandescent lamp in the predetermined relation desired. The ends of this supplemental base 19 are provided with holes to receive the pins 18. In this construction, the lamp may readily be removed from the support by pushing it downward against the resilient center contact strap 9, thereby disengaging the pin 18 from the holes in base 19 and permitting the lamp to be turned toward the left and removed.

The modified form of the invention illustrated in Figs. 7, 8 and 9 comprises a base block 20 adapted to be anchored by screws 21 into a light signal casing and the like. A cylindrical socket member 22 is fastened to the top of the base 20 by a bolt 23 extending through the ear 24 integral therewith. This socket member 22 is provided with the usual hooked slots 25, commonly provided in sockets of the bayonet type. The lower portion of the socket 22 is cut away on the side opposite to the extending ear 24 to provide clearance for the resilient center contact strip 26 fastened to the block 20 by the bolt 27 and nut 28. This contact strip 26 serves as a conductor to the middle contact of a lamp adapted to be used in this lamp support, and also to urge the lamp upward into the hook portion of the bayonet slots 25.

A lamp especially rebased to fit the socket and lamp support shown in Fig. 9 is more specifically shown in Fig. 7. This lamp 30 is of the usual commercial bayonet type, from which the original bayonet pins have been removed, on the base 31 of which is fastened a spacing ring 32 to insure the proper location of the lower portion of the base 31 in the socket member 22. After this ring 32 has been applied, the pins 33 will be soldered or spot-welded to the base 31 at such points that the filament 34 will be located at the proper point with respect to the socket 22. This lamp may be readily replaced in the same manner as the well-known bayonet type commercial lamp, the advantage of applicant's structure being that the new lamp will have its filament located at the same point as that of the lamp replaced, especially since three bayonet pins are used which define a plane, thereby allowing the lamp to assume only one definite axial position with respect to the socket 22. If desired these pins may be unsymmetrically spaced, so that the lamp may be inserted into the lamp in one way only.

In Fig. 10 a concentrated filament commercial lamp 40 is shown, which has a supplemental base soldered or spot-welded to the usual base 42. The supplemental base 41 in this instance comprises a metallic ring which has been fastened to the base 42, so that the filament 43 of the lamp falls in axial alignment with the ring 41 and a predetermined distance therefrom. This lamp 40 is adapted to be supported on the lamp support illustrated in Fig. 11. This lamp support comprises a base 45 of suitable insulating material, having its center recessed and lined with a conducting thimble 46 to receive the center contact plunger 47 which is urged upwardly by a spring 48. A retaining contact strip 49 is fastened to the block 45 by the bolt 50 and nut 51 to serve as an electrical connection between the bolt 50 and the contact plunger 47, and also as a retaining means to maintain this contact plunger 47 within the thimble 46 when the lamp 40 is removed. On the other side of the insulating block 45 is supported a base plate 52 by the bolt 53 and nut 54. This base plate 52 is provided with a large circular opening on which is supported a ring 44, having upstanding pedestals 55 on opposite sides thereof.

These pedestals 55 are provided with sloping faces against which are pivotally supported locking levers 56 by screws 57. Each locking lever 56 comprises a disc having an extending handle which is pivoted at a point eccentric with respect to the disc, so that as the handle is moved in a certain direction the edge of the disc will be forced downward against the base plate 52. The ring 44 being of a slightly larger diameter than the opening formed in the base plate 52 provides a seat for the supplemental base 41 of the lamp 40. In order to permit this supplemental base 41 to be inserted into the ring 44 in one way only, this ring 44 is provided with a notch shown at 58 into which the extension 59 on the supplemental base 41 is adapted to fit. After the lamp has been put in place so that the supplemental base 41 rests on the base plate 52 in the ring 44, the same may be locked in place by operating the locking levers 56 to wedge them against this supplemental base.

It should be particularly noted how the addition of a properly fastened supplemental base changes the position of the filament with respect to a support for such base. By looking at Fig. 10, for instance, where the lamp 40 has been illustrated on a center line drawn through the axis of the standard base 42, it is seen that the filament leans considerably toward the left of this center line. In Fig. 11, this same lamp is shown with respect to a center line drawn through the axis of the supplemental base 41, and shows the filament lining up perfectly with this line.

From the foregoing it will be observed that this invention provides a lamp mounting for railway light signals, which permits lamps to be easily and quickly put in signals by ordinary and unskilled labor when it is required to replace lamps burned out or otherwise unfit for service, without requiring any special adjustment and without likelihood of being wrongly placed by a careless workman. The rebasing scheme does not alter regular methods of manufacturing lamps, but uses lamps made commercially, and merely adds or supplements an additional base upon the original base which is located to have a predetermined relation with respect to the filament of such lamp, and therefore facilitate the interchangement of lamps when they are burned out or are changed for any other reason without in any way interfering with the proper relation between the filament and the light projecting unit of a signal.

The practical advantages of employing such standardized lamps will be evident upon comparison with the old scheme of adjusting each signal whenever a new commercial lamp is put into service. In one case, the adjustment can be made during manufacture, so to speak, with the aid of suitable tools and apparatus, assuring uniform and accurate results; whereas adjustments in the field are cumbersome and inaccurate.

The structure of the rebasing arrangements shown in the various embodiments illustrated are effective to prevent displacement by the lamp by jar and vibration after once put in place, and also make the manipulation of replacing lamps a practically foolproof performance.

Having thus shown and described various embodiments of the invention, it is to be understood that they do not exhaust all possible means by which this invention may be carried out, but merely illustrate their nature and mode of operation.

What I claim as new and desire to secure by Letters Patent of the United States, is:—

1. In a light unit, the combination with a commercial incandescent lamp having a conducting base, a center contact and a concentrated filament, of a strap of metal rigidly fastened to the base of said lamp so as to have a predetermined relation with said filament, and a support comprising an insulating base, a pair of supports on said base for engaging the ends of said strap to support it in a predetermined manner, and a spring contact adapted to engage the center contact of said lamp.

2. A light unit for signal casings comprising, a commercial incandescent lamp having a conducting base, a center contact and a concentrated filament, a strap of metal fastened to the base of said lamp in a predetermined relation with said filament; and a support for said lamp comprising an insulating base, a pair of members on said base having spring locks for releasably engaging the ends of said strap to support it in a predetermined manner, and a spring contact engaging the center contact of said lamp.

3. The combination of a commercial incandescent lamp having a conducting base, center contact and a concentrated filament; a strap of conducting material having holes near its opposite ends fastened to said base so that the holes have a predetermined relation to said filament; and a support comprising an insulating block, a pair of supporting members on said block each having a pin adapted to engage a hole in said strap, and a spring-pressed contact strip engaging the center contact of said lamp.

4. A lamp support comprising an insulating block, upstanding metallic members mounted on said block, a pin extending from the side of each of said members, springs bearing against said pins, and a resilient center contact disposed substantially midway between said members.

5. A lamp support comprising an insulating block, upstanding metallic members on said block having horizontal extensions, a pin in each of said extensions, a resilient center contact disposed between said members and a lamp base adapted to cooperate with said pins and said center contact.

6. The combination of a commercial incandescent lamp having a cylindrical conducting base, center contact, and a concentrated filament, of a supplemental base rigidly secured to and extending a considerable distance beyond the cylindrical surface of said lamp base and having a predetermined relation to said filament; and a support for said lamp comprising an insulating block, and means for clamping said supplemental base to firmly support said lamp on said block and to conduct current to said conducting base, and a spring-pressed contact for conducting current to the center contact of said lamp.

7. A rebased lamp comprising a commercial incandescent lamp of the concentrated filament type having a cylindrical metallic base connected to one end of the filament and a center contact connected to the other end of the filament and a supplemental base extending laterally with respect to the axis of said cylindrical base provided with a plane surface having openings therein, said supplemental base being electrically and mechanically secured to said lamp in a manner such that said plane and openings have a predetermined relation to said filament, said supplemental base thereby defining the position of said filament and serving as a current conducting medium for said filament.

8. A rebased lamp comprising, a commercial incandescent lamp having a filament of the concentrated type and provided with a cylindrical metallic base electrically connected to one end of said filament, and a supplemental base electrically and mechanically connected to said cylindrical base comprising two flat portions extending in opposite directions from said cylindrical base in substantially the same plane and having openings therein, said supplemental base being so connected to said cylindrical base that the surfaces and openings predetermine the relation of the supplemental base to that of the filament.

9. A rebased lamp for signals, comprising, a concentrated filament type of commercial incandescent lamp with a conducting base, an elongated strap fixed to the base with its ends extending laterally of the base and bearing a predetermined space relation to the lamp filament, and means for clamping the ends of the strap in fixed position.

10. A rebased lamp for signals, comprising, a concentrated filament type of commercial incandescent lamp with a conducting base, an elongated strap fixed to the base with its ends extending laterally of the base, plane bearing surfaces on the strap ends having a predetermined space relation to the lamp filament, a support having plane bearing surfaces, and means for clamping the strap ends to the support with the bearing surfaces in contact.

In testimony whereof I hereto affix my signature.

RICHARD C. LEAKE.